United States Patent
Erb et al.

(10) Patent No.: US 7,073,277 B2
(45) Date of Patent: Jul. 11, 2006

(54) SHOE HAVING AN INNER SOLE INCORPORATING MICROSPHERES

(75) Inventors: Robert Erb, Plandome, NY (US); Hyun Jin Kim, Carlsbad, CA (US); Marco Grott, San Marcos, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 10/877,625

(22) Filed: Jun. 25, 2004

(65) Prior Publication Data

US 2005/0027025 A1    Feb. 3, 2005

Related U.S. Application Data

(60) Provisional application No. 60/484,787, filed on Jul. 2, 2003, provisional application No. 60/483,374, filed on Jun. 26, 2003.

(51) Int. Cl.
  *A43B 13/38* (2006.01)
(52) U.S. Cl. .......................... 36/43; 36/154; 525/330.9; 525/332.5; 525/328.8; 524/504; 524/507; 528/44; 528/52; 528/85
(58) Field of Classification Search .................. 36/43, 36/154; 428/314.4; 521/50; 525/330.9, 525/332.5, 328.8; 524/504, 507; 528/44, 528/52, 85
See application file for complete search history.

(56) References Cited

U.S. PATENT DOCUMENTS

| | | | |
|---|---|---|---|
| 3,615,972 A | 10/1971 | Morthouse, Jr. | 156/79 |
| 4,075,138 A | 2/1978 | Garner | 260/2.5 B |
| 4,126,504 A * | 11/1978 | Wolinski et al. | 156/310 |
| 4,430,448 A * | 2/1984 | Schaefer et al. | 521/54 |
| 4,451,995 A | 6/1984 | Antonious | 36/51 |
| 4,503,576 A | 3/1985 | Brown | 12/146 M |
| 4,510,636 A | 4/1985 | Phillips | 12/1 R |
| 4,517,696 A | 5/1985 | Schartz | 12/1 R |
| 4,745,290 A | 5/1988 | Frankel et al. | 250/560 |
| 4,876,758 A | 10/1989 | Rolloff et al. | 12/142 N |
| 4,906,721 A * | 3/1990 | Weitemeyer et al. | 528/29 |
| 5,058,585 A | 10/1991 | Kendall et al. | 128/581 |
| 5,083,910 A | 1/1992 | Abshire et al. | 425/2 |
| 5,101,580 A * | 4/1992 | Lyden | 36/93 |
| 5,244,613 A * | 9/1993 | Hurley et al. | 264/50 |
| 5,257,470 A | 11/1993 | Auger et al. | 36/88 |
| 5,313,717 A | 5/1994 | Allen et al. | 36/28 |
| 5,329,701 A | 7/1994 | Schultz et al. | 30/316 |
| 5,430,961 A | 7/1995 | Faulconer et al. | 36/93 |
| 5,444,926 A | 8/1995 | Allen et al. | 36/93 |
| 5,640,779 A | 6/1997 | Rolloff et al. | 33/514.2 |
| 5,665,785 A * | 9/1997 | McClellan et al. | 521/51 |

(Continued)

FOREIGN PATENT DOCUMENTS

JP        60-244511        12/1985

(Continued)

*Primary Examiner*—Hai Vo
(74) *Attorney, Agent, or Firm*—Sheppard, Mullin, Richter & Hampton LLP

(57) ABSTRACT

The invention relates to the field of shoes in general, and more specifically to the application of microspheres in shoe material formulations to yield desired shoe properties. Even more specifically, the invention relates to a shoe component prepared from a closed cell foam incorporating microspheres to yield controlled cell size, cell size distribution and expansion characteristics. In another embodiment, the invention also relates to an inner sole for a shoe prepared from the reaction product of a polymer matrix component and a curing agent where the curing agent is incorporated in microspheres to yield a material conformable to the user's foot shape.

15 Claims, 1 Drawing Sheet

U.S. PATENT DOCUMENTS

| | | |
|---|---|---|
| 5,714,098 A | 2/1998 | Potter .................... 264/40.1 |
| 5,733,647 A | 3/1998 | Moore, III et al. ...... 428/304.4 |
| 5,787,608 A | 8/1998 | Greenawalt ................ 36/11.5 |
| 5,829,171 A | 11/1998 | Weber et al. ................ 36/93 |
| 5,879,725 A | 3/1999 | Potter .................... 425/403 |
| 5,895,794 A * | 4/1999 | Berg et al. ................ 523/217 |
| 5,901,394 A | 5/1999 | Greenawalt ............... 12/142 N |
| 5,909,719 A | 6/1999 | Throneburg et al. ...... 12/142 R |
| 5,939,157 A * | 8/1999 | Allen et al. ................ 428/35.7 |
| 6,012,726 A | 1/2000 | Grande et al. ........... 280/11.22 |
| 6,026,595 A | 2/2000 | Curry ........................ 36/93 |
| 6,163,982 A | 12/2000 | Ellis, III .................... 36/25 R |
| 6,247,250 B1 | 6/2001 | Hauser ........................ 36/44 |
| 6,280,815 B1 | 8/2001 | Ersfeld et al. ................ 428/71 |
| 6,486,237 B1 * | 11/2002 | Howe et al. ................ 524/71 |

FOREIGN PATENT DOCUMENTS

WO        WO 9921918 A1 *  5/1999

* cited by examiner

SHOE HAVING AN INNER SOLE INCORPORATING MICROSPHERES

CROSS-REFERENCE TO RELATED APPLICATIONS

Priority is claimed under 35 U.S.C. § 119(e) to U.S. Provisional Patent Application No. 60/483,374, filed on Jun. 26, 2003, entitled "Shoe Component With Closed Cells In A Resin," and U.S. Provisional Application No. 60/484,787, filed on Jul. 2, 2003, entitled "Conformable Sole For Sports Shoe," both by Robert Erb, Hyun Jim Kim, and Marco Grott, which applications are incorporated by reference herein.

BACKGROUND OF THE INVENTION

1. Field of the Invention

The invention relates to the field of shoes in general, and more specifically to the application of microspheres in shoe material formulations to yield desired shoe properties. Even more specifically, the invention relates to a shoe component prepared from a closed cell foam incorporating microspheres to yield controlled cell size, cell size distribution and expansion characteristics. In another embodiment, the invention also relates to an inner sole for a shoe prepared from a reactive polymer component and a curing agent where the curing agent is incorporated in microspheres to yield a material conformable to the user's foot shape.

2. Description of Related Art

Shoe components often must exhibit a combination of key performance variables by virtue of the stresses resulting from long-term shoe wear. These variables include strength characteristics such as impact strength and durability, as well as characteristics more closely associated with shoe comfort, such as softness, resilience and conformability to the user's foot shape.

Foamed compositions based on ethylene vinyl acetate (EVA) or polyurethane have been used extensively in shoe component manufacture. Typically, such materials, when used in shoe sole applications, should exhibit a balance of density and hardness and compression set. Although the hardness of a foam is primarily a function of the hardness of the base polymer matrix, the cell structure may also play a role in terms of a foams resistance to penetration. For instance, foams with a large population of voids near the surface may have less resistance to penetration than one with less surface voids. Foams may have primarily open or closed cell structures and a distribution of cell sizes. Foams used in shoe applications preferably have a primarily closed cell structure as this leads to reduced compression set, so that the shoe part, such as shoe sole, will not flatten with prolonged compressive loading. The closed cell foam will also impart good resilience and elasticity. Finally, the closed cell structure will lead to a shoe part with greater endurance and durability while under continuous load.

It has been known that the density and cell size of, and the amount of closed cells in, a foamed shoe material can be adjusted by using different types and/or amounts of blowing agents in the foam blowing process. During the shoe molding process, thermal energy is applied to the composition, which chemically activates the foaming agent, releasing a gas such as carbon dioxide ($CO_2$) or nitrogen ($N_2$), which causes a volumetric expansion in the resin matrix resulting in voids. Typically such reaction processes are controlled by the usual process variables of time, temperature, pressure, type and concentration of the various reagents. However, it is still difficult to control the precise nature of the foams cellular structure such as the degree to which the foam is open celled or closed celled.

Similarly, in addition to durability, a shoe must be comfortable to wear, an important factor in which, is how the shoe inner sole conforms to the shape of the wearers foot. This conformability feature is especially important in sports shoes, which can be subjected to either rigorous motion, as in athletic shoes, or long walks over undulating terrain, as in a golf shoe. Shoes that are conformable to the individual wearer can be obtained using several different methods. Professionally crafted shoe inserts are one expensive and time-consuming option. Another option includes custom fitting the shoe by measuring the shape of the foot in three dimensions, and forming the shoe inner sole using the measurement data. However, this process requires a specially designed device to measure the shape of the foot in three dimensions, a separate measurement for each wearer's foot, and a custom production of the shoe insert or inner sole of the shoe using the measurement data. Overall, it is difficult to economically incorporate this process into a mass production line for a shoe.

Numerous other processes are available that provide a shoe offering a more custom fit. Examples of these processes include the use of stock shoe inlays for heel and/or arch support, inserts composed of a gel contained within membrane layers, and air bladders into which air is pumped to achieve support under the foot. In addition, one type of an insert used in sport boots or shoes is heated in a microwave and then inserted and immediately worn in the boot or shoe. The insert shapes itself to the wearer's foot as the insert cools. The aforementioned processes require special apparatus and manipulation, and/or simply do not provide adequate customization for the wearer of the shoe.

U.S. Pat. No. 6,280,815 to Ersfeld et al. ("the Ersfeld patent") also discloses a shoe insert that custom forms to, and permanently retains, the shape of a foot that it will support and the shoe in which it will be used. The Ersfeld patent discloses a conformable substrate layer and an outer layer. At least a portion of the conformable substrate layer is impregnated with a storage-stable, setable resin that sets after less than 10 minutes of exposure to an activator, preferably water. While this process requires only the use of water, preferably warm, it is inconvenient to have to wet the insert, wear the shoe and damp insert for a set amount of time while maintaining the foot in a fixed position, and remove the insert to allow it to completely dry. Also, because the position of the foot is held constant, this process produces an insert that does not comfortably accommodate a range of foot activity Accordingly, there is a need for a shoe component material which includes a closed cell foam having controlled size, expansion characteristics, and distribution in the resin matrix. There is also a need for a custom-fit shoe or insert that can be prepared in an easy and cost-effective manner, and that conforms precisely to the wearers shoe shape, such that the resulting shoe can comfortably accommodate a range of foot activity. There is also a need for a product which custom forms to, and permanently retains, the shape of the foot of an individual user after the shoe has been manufactured and purchased. The present invention satisfies all of these needs.

SUMMARY OF THE INVENTION

The present invention describes improved compositions and methods of manufacture of materials for use as shoe components.

In one embodiment a material for use as a shoe component is described having a prescribed specific gravity including closed cells having a controlled size, expansion characteristics, and distribution in a resin matrix. More particularly, the invention resides in embodiments of a composition for making a foam shoe component including at least two components selected from any of the following components:
- a base resin of thermoplastic resin or thermoset resin;
- closed cells in the form of microspheres having a predetermined volume, which include a shell and an encapsulated gas within the shell; and/or
- closed cells in the form of microspheres including a shell and a chemical agent, which result in volumetric expansion of the microsphere upon exposure to a predetermined level of thermal and/or radiational energy.

Also, the composition for making the shoe component may include any of the following additional components:
- organic, inorganic, or metallic fillers;
- organic, inorganic, or metallic fibers in the form of continuous or non-continuous fibers;
- fatty acids or fatty acid salts, such as metal stearates; and/or
- a catalyst, activator, co-activator, crosslinking agent, co-crosslinking agent, accelerator, co-accelerator, retardant, vulcanizing agent, colorant, optical brightener, uv stabilizer, anti-oxidant, processing aid, or mold release.

These additional components may be added separately or further incorporated within microspheres either in separate microspheres than those incorporating an encapsulated gas or chemical agent, or as a mixture within the microspheres incorporating the encapsulated gas or chemical agent.

In another embodiment of the present invention, an improved inner sole for a golf shoe that conforms to an individual's foot over a predetermined period of time under predetermined conditions is described. More particularly, this embodiment has one or more of the following features:
- an inner sole including a a base polymer matrix resin and microspheres, where the reaction product includes mono-functional, di-functional, or multi-functional reactant(s) made up of diol(s), polyol(s), isocyanates(s), and amine(s), and the microspheres including a shell and an encapsulated chain extender(s), crosslinking agent(s), and/or curing agent, where the chain extender(s) can include diol, polyol, dendrimer, diisocyanate, polyisocyanate, diamine, polyamine, or mixtures thereof;
- an inner sole including a silicone material and microspheres, where the silicone material includes monomeric, oligomeric, prepolymeric silicone, or polymeric silicone with or without additional reinforcing filler, and the microspheres include an encapsulated catalyst, crosslinking agent, or concentrate of those, which includes sulfur compounds, platinum catalysts, peroxides, alkylalkoxyacyloxysilane, silicone, or other chemical, which has reactive groups that undergo hydrolytic polymerization, chemical component with mercaptoalkyl substituents, or mixtures thereof; and
- an inner sole including a shoe-making composition having a responsive polymer network or aggregation that changes rheological and mechanical properties reversibly by an applied stimulus with or without volumetric changes, where the shoe-making composition is made of thermoplastic or thermoset resin which is a reaction product monomer, oligomer, prepolymer, polymer, or blends thereof.

Other features of the invention should become apparent from the following description of the preferred embodiments taken in conjunction with the accompanying drawings, which illustrate, by way of example, the principles of the invention.

DETAILED DESCRIPTION OF THE PREFERRED EMBODIMENTS

Figure 1:
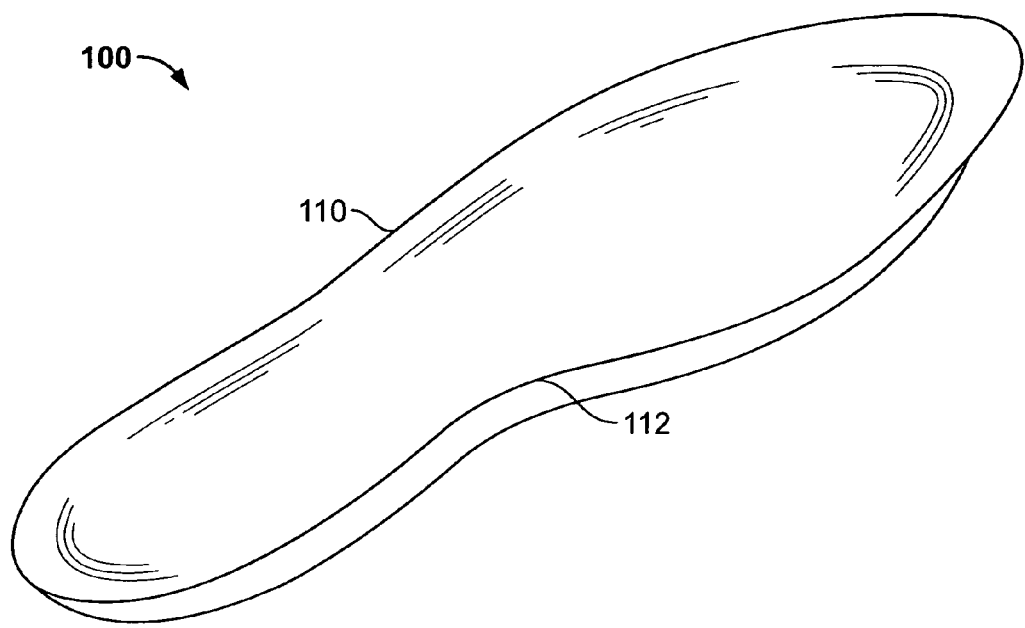
FIG. 1 is a perspective view of an inner sole according to a preferred embodiment.

The term "crosslinking agent" as used herein means a reagent containing functionality, which is reactive with the components of a polymer chain such that on reaction it forms a bridging group between two or more polymer chains.

The term "chain extender" as used herein means as used herein means a reagent containing functionality, which is reactive with the components of a polymer chain such that on reaction it adds to one or more polymer chains, extending their length.

The term "curing agent" as used herein means a crosslinking agent or a chain extender The term "conformable" as used herein describes a material with the ability via its flow characteristics to take on the shape of an object through which pressure and or heat is applied The term "closed-cell foam" as used herein means a foam containing greater than or equal to 60 percent closed cells according ASTM D2856-94.

The term "optimum foaming temperature" is used herein to indicate a foaming temperature at or above the blends glass transition temperature or melting point and within a range in which the foam does not collapse.

The term shoe as used herein means all forms of shoe which have a sole, including but not limited to, dress shoes, boots, sneakers, clogs, sandals, slip on sandals and shoes, golf shoes, tennis shoes, running shoes, athletic shoes, hiking shoes, ski boots, cycling shoes, soccer boots, and the like.

The term "microspheres" or "polymeric microspheres" as used herein means a thermally expandable spherical and hollow polymer product with an outer shell. Microspheres which encapsulate liquid blowing agents are described in the following U.S. Patents, the entire contents of each of which are herein incorporated by reference. Thus, Morehouse et al., in U.S. Pat. No. 3,615,972, disclose thermoplastic microspheres, which encapsulate a liquid blowing agent. Such microspheres are the to be readily prepared from a wide variety of materials. Garner, in U.S. Pat. No. 4,075,138, discloses a method for the preparation of a synthetic resinous thermoplastic microsphere employing 60–90 parts by weight vinylidene chloride and from 40-10 parts by weight of acrylonitrile. Microencapsulated blowing agents have been used in a reaction injection molding process as described in Japanese Patent Publication No. 59-98564 [Japanese Patent Publication (KOKAI) 60-244511]. A heat-expandable microcapsule is activated during the curing stage of a reaction injection molding process. Another such microsphere is currently commercially available from Akzo Nobel Inc., under the trade name EXPANCEL™ and is a white, spherically formed particle with a shell consisting of a thermoplastic, which encapsulates the blowing agent, liquid isobutene.

The terms "base resin" and "polymeric matrix resin" are used interchangeably herein and mean the major polymer component of a mixture in which the microspheres, in either expanded or unexpanded form, are encapsulated.

In one embodiment the present invention is a closed cell foam comprising a polymeric matrix material, and polymeric microspheres which contain an encapsulated gas and/or chemical blowing agent.

The base resin or polymeric matrix material for the foam can comprise a thermoplastic resin or thermoset resin, which can be a reaction product monomer, oligomer, prepolymer, polymer, or blends thereof. The microspheres have a predetermined volume, and consist of a shell and an encapsulated gas or chemical agent, which can result in volumetric expansion of the microspheres after exposure of the microsphere to a predetermined level of thermal and/or radiational energy.

The shoe component material fabricated from the foam can further include organic, inorganic, or metallic fillers; organic, inorganic, or metallic fibers in the form of continuous or non-continuous fibers; fatty acids, fatty acid salts, such as metal stearates; and/or a catalyst, activator, co-activator, crosslinking agent, co-crosslinking agent, accelerator, co-accelerator, retardant, vulcanizing agent, colorant, optical brightener, uv stabilizer, anti-oxidant, processing aids, and mold release.

Examples of suitable base or polymeric matrix resins include polymeric materials, such as, thermoplastics, thermosets, thermoplastic elastomers, thermoset elastomer, thermoplastic vulcanizate, semi-Inter Penetrating Network, fully- Inter Penetrating Network, synthetic, natural rubbers and any and all combinations thereof.

Non-limited but suitable polymers include synthetic rubber, polycarbonate, polyolefin, functionalized polyolefin, copolymeric ionomer, terpolymeric ionomer, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, metallocene-catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-propylene copolymer, ethylene vinyl acetate, polyurea, and polysiloxane or any metallocene-catalyzed polymers of these species. Particularly suitable polymers include ethylene vinyl acetate (EVA), polytrimethylene-terephthalate, polyethylene-terephthalate, polybutyleneterephthalate, ethylene-carbon monoxide copolymer, polyvinyl-diene flourides, polyphenylenesulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with a functional group, polymers based on ethylene-propylene-(diene), polymers based on functionalized ethylene-propylene-(diene), dynamically vulcanized polypropylene/ethylene-propylene-diene-copolymer, thermoplastic vulcanizates based on ethylene-propylene-(diene), urethane, thermoplastic polyetherurethane, thermoplastic polyesterurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene.

Preferred embodiments of the base resin in the shoe component material include ethylene vinyl acetate (EVA), urethane, thermoplastic polyurethane, thermoset polyurethane, styrenic block copolymer, styrenic block copolymer with a functional group, cis-polyisoprene, trans-polyisoprene, syndiotactic 1,2-polybutadiene, silicone, or blends thereof. The ethylene vinyl acetate polymer, ethylene vinyl acetate/acid terpolymer, and mixtures thereof preferably have a vinyl acetate content between approximately 5% and approximately 50%, more preferably between approximately 5% and approximately 40%, and most preferably between approximately 5% and approximately 30%. The ethylene vinyl acetate polymer, ethylene vinyl acetate/acid terpolymer, and mixtures therof preferably have a mean molecular weight between approximately 5,000 and approximately 450,000, more preferably between approximately 10,000 and approximately 400,000, and most preferably between approximately 10,000 and approximately 350,000.

The thermoplastic or thermoset urethane used in the base resin can include aromatic or aliphatic urethane, which can be either ether-type or ester-type urethane or mixtures thereof. Urethane is a reaction product of the combination of materials selected from polyols and diisocyanates with or without chain extenders, such as diols, polyols, diisocyanates, diamines, polyamines, and combinations thereof. Polyol chain extenders may be primary, secondary, or tertiary polyols. Specific examples of monomers of these polyols include trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol. Diamines also can be added to urethane prepolymer to function as chain extenders. Suitable diamines, for example, include tetramethylenediamine, pentamethylenediamine, hexamethylenediamine, p,p'-methylenedianiline, and p-phenylenediamine. Aromatic diamines have a tendency to provide a stiffer, i.e., having a higher Mooney viscosity, product than aliphatic or cycloaliphatic diamines. Suitable polyamines that can be used as chain extenders include primary, secondary, and tertiary amines, such as diamine, triamine, and tetramine. Example polyamines include an aliphatic amine, such as hexamethylenediamine; an alicycle amine, such as 3,3'-dimethyl-4,4'-diamino-dicyclohexyl methane; or, an aromatic amine, such as 4,4'-methylene bis-2-chloraniline, 2,2', 3,3'-tetrachloro-4,4'-diaminophenyl methane, or 4,4'-diaminodiphenyl; and 2,4,6-tris(dimethylaminomethyl) phenol. These chain extenders can be used either alone or in combination.

The syndiotactic 1,2-polybutadiene used in the base resin has a crystallinity between approximately 5% and approximately 50%, a mean molecular weight between approximately 10,000 and approximately 350,000, and a percentage of 1,2-bonds greater than approximately 50%. Preferably, the syndiotactic 1,2-polybutadiene has a crystallinity between approximately 10% and approximately 40%, and more preferably between approximately 15% and approximately 30%. Preferably, the syndiotactic 1,2-polybutadiene has a mean molecular weight between approximately 50,000 and approximately 300,000, more preferably between approximately 80,000 and approximately 200,000, and most preferably between approximately 100,000 and approximately 150,000. Preferably, the syndiotactic 1,2-polybutadiene has a percentage of 1,2-bonds greater than approximately 50%, more preferably greater than approximately 70%, and most preferably greater than approximately 90%.

The silicone included in the base resin can be a monomer, olgiomer, prepolymer, or polymer with or without additional reinforcing filler. Specific examples of suitable silicones include trimethylsiloxy-endblocked dimethylsiloxane-methylhexenylsiloxane copolymers, dimethylhexenlylsiloxy-endblocked dimethylsiloxane-methylhexenylsiloxane copolymers, trimethylsiloxy-endblocked dimethylsiloxane-methylvinylsiloxane copolymers, trimethylsiloxy-endblocked methylphenylsiloxane-dimethylsiloxane-methylvinylsiloxane copolymers, dimethylvinylsiloxy-endblocked dimethylpolysiloxanes, dimethylvinylsiloxy-endblocked dimethylsiloxane-methylvinylsiloxane copolymers, dimethylvinylsiloxy-endblocked methylphenylpolysiloxanes, dimethylvinylsiloxy-endblocked methylphenylsiloxane-dimethylsiloxane-methylvinylsiloxane copolymers, and similar copolymers wherein at least one end group is dimethylhydroxysiloxy. One other type of silicone material has at least 1 alkenyl group including at least 2 carbon atoms in their molecules. Examples of these alkenyl groups include, but are not limited to, vinyl, allyl, butenyl, pentenyl, hexenyl, and decenyl. The alkenyl functionality can be located at any location of the silicone structure, including one or both terminals of the structure. The remaining, i.e., non-alkenyl, silicon-bonded organic groups are independently selected from hyrdocarbon or halogenated hydrocarbon groups that contain no aliphatic unsaturation. Examples of the non-alkenyl silicon-bonded organic groups include alkyl groups such as methyl, ethyl, propyl, butyl, pentyl, and hexyl; cycloalkyl groups such as cyclohexyl and cycloheptyl; aryl groups such as phenyl, tolyl, and xylyl; aralkyl groups such as benzyl and phenethyl; and halogenated alkyl groups such as 3,3,3-trifluoropropyl and chloromethyl. Another suitable type of silicone material is one having hydrocarbon groups that lack aliphatic unsaturation.

As discussed above, the microspheres can include either a shell and encapsulated gas, or a shell and hydrocarbon or other chemical agent, which can result a volumetric expansion after exposure to thermal and/or radiational energy. The shell can be made from any polymeric materials, for example, the polymeric materials previously discussed in this document. Examples of encapsulated gasses include $CO_2$ or $N_2$. The hydrocarbon includes a chemical blowing agent, for example, isobutane, isopentane, azo compounds, or any chemical blowing agent which releases $CO_2$ or $N_2$ upon exposure to thermal or radiational energy. Other blowing agents useful in making the present foams include inorganic blowing agents, organic blowing agents and chemical blowing agents. Suitable inorganic blowing agents include sulfur hexafluoride ($SF_6$), argon, water, air and helium. Organic blowing agents include carbon dioxide, aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride,), 1,1-difluoroethane (HFC-152a), fluoroethane (HFC-161), 1,1,1-trifluoroethane (HFC-143a), 1,1,1,2-tetrafluoroethane (HFC-134a), 1,1,2,2 tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloro-ethane, 1,1-dichloro-1-fluoroethane (HCFC-141b), 1-chloro-1,1-difluoroethane (HCFC- 142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichloro-trifluoroethane (CFC-113), dichlorotetrafluoroethane (CFC-114), chloroheptafluoropropane, and dichlorohexafluoropropane. Chemical blowing agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitroso-terephthalanide, trihydrazino triazine and mixtures of citric acid and sodium bicarbonate such as the various products sold under the name Hydrocerol™. (a product and trademark of Boehringer Ingelheim). All of these blowing agents may be used as single components or any mixture of combination thereof, or in mixtures with other co-blowing agents.

There is no limitation the size of the microspheres, however, it is preferred that the outside diameter of an unexpanded microsphere be less than 100 µm, more preferably less than 80 µm, and most preferably less than 60 µm.

The concentration of the microspheres in the base resin or polymeric matrix material is typically selected to give the desired product properties but typically ranges from about 0.25 to about 20, preferably from about 0.5 to about 15, more preferably from about 1 to about 10 pph.

Volumetric expansion of a microsphere, after exposure to heat or radiation, is at least 10, preferably at least 50, more preferably at least 100, and even more preferably at least 200% more than the volume of an unexpanded microsphere.

The final foam has an average cell size of from about 5 to about 2,000, preferably from about 20 to about 1,000, and more preferably about 50 to about 500 microns according to ASTM D3576-77.

The closed-cell foam may contain greater than or equal to 60, preferably greater than or equal to 70, more preferably greater than or equal to 80-percent closed cells according to ASTM D2856-94.

Unexpanded or expanded microspheres can be introduced into the base resin by dry mixing, melt-mixing, or by use of a concentrate with various loading levels and carrier resins.

The present foam structure may be made by a conventional extrusion foaming process. By the term "foaming conditions" is meant a process in which a blend of microsphere and polymer matrix material is heated to form a plasticized or melt polymer material, and extruding the gel through a die to form the foam product. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level. By this process, plank, sheet, rod and tube-shaped foam products are prepared.

Volumetric expansion of unexpanded microspheres can be occur before the molding/extrusion process, during the molding/extrusion process, after the molding/extrusion process, or during a combination thereof. The molding process can include an injection molding process, blow molding, injection-blow molding, compression molding process, transfer molding process, or combination thereof. The extrusion process can include profile extrusion, sheet extrusion, or a typical extrusion process for making plastic resin pellets. The method of manufacturing the shoe component need not be limited to a particular method of mixing the microspheres into the base resin and processing that mixture. One preferred example of the shoe component manufacturing process includes an in-situ foaming process, in which volumetric expansion of the microspheres is achieved during the part molding or extrusion processes. One specific example includes either an injection molding or compression molding process including a resin through which microspheres are dispersed, wherein the resin is introduced into a mold by injection molding or dispensing, the mold is closed, thermal and/or radiational energy is applied to the microspheres expanding them with or without curing or crosslinking of the resin in the mold, the resin is foamed by volumetrically expanding the microspheres in the resin within the mold, the resulting resin is demolded, and any post-molding or post-curing processes are performed.

The present invention also relates to a method of using microspheres in a reactive polymeric matrix for a shoe inner sole composition, the microspheres incorporating a curing agent such as a cross-linking agent or a chain extender. When the user first wears the shoe, the pressure or heat of the user's foot causes rupture of the microspheres releasing the curing agent and allowing the material to cure while conforming to support the foot's pressure zones. In this way the material of the inner sole may be provided in an uncontoured state at the time of purchase and, on subsequent use, will conform the contours of the wearers foot.

More specifically, and referring to FIG. 1, embodiments of the present invention are included in an improved inner sole 100 for a golf or sport shoe (not shown), and a method of manufacturing a shoe component (not shown), that conforms to an individual wearer's foot (not shown) over a predetermined period of time and/or under predetermined conditions, e.g., a prescribed activity. The sport shoe has an upper and a sole, where the upper extends over a portion of the wearer's foot, and the sole has an outsole for directly contacting the ground surface. The inner sole is located on top of the sole of the sport shoe. The material of the inner sole is provided in an uncontoured state at the time of purchase. As the wearer's foot generates thermal energy and/or pressure that is applied to the shoe, and in particular to the inner sole of the shoe, the material conforms to support the foot's pressure zones. Examples of the prescribed activity may include swinging a golf club or walking. During a golfer's swing, his or her body weight is transferred between the left and right feet in a generally rotational motion, accordingly putting pressure onto the inner soles of the left and right shoes. As the golfer walks, the specific contour of each of his or her feet, such as the shape of each foot's arch, applies pressure to the inner soles of the shoes. After a predetermined period of time and use, the inner sole for each shoe retains a shape that conforms to the pressure zones unique to that wearer. Thus, a single inner sole may be manufactured that subsequently customizes itself for each of a wide variety of wearer's feet.

Figure 2:
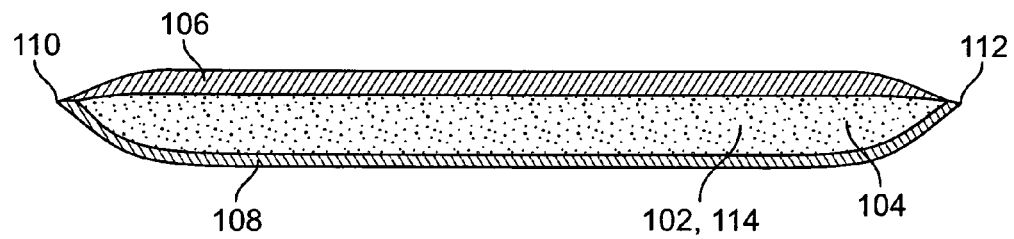
FIG. 2 is a sectional view of the inner sole illustrated in FIG. 1.

Referring to the sectional view of the inner sole 100 illustrated in FIG. 2, in a first embodiment, the inner sole includes a reaction product 102 and microspheres 104, e.g., microspheres, located between a top and bottom outer layer 106 and 108, respectively. The top and bottom outer layers may be made of a single unit polymer (no encapsulation), or the closed cell foam compositions comprising microspheres as described herein. The top and bottom outer layers connect to one another at the edges 110 and 112 of the inner sole. Examples of polymeric materials include the closed cell foam compositions comprising microspheres as described herein, or thermoplastics, thermosets, thermoplastic elastomers, thermoset elastomer, thermoplastic vulcanizate, semi-Inter Penetrating Network(IPN)s, full-IPNs, and rubbers. Non-limited but suitable polymers include synthetic rubber, polycarbonate, polyolefin, functionalized polyolefin, copolymeric ionomer, terpolymeric ionomer, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, metallocene-catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ethylene-propylenediene terpolymer (EPDM), ethylene-propylene copolymer, ethylene vinyl acetate, polyurea, and polysiloxane or any metallocene-catalyzed polymers of these species. Particularly suitable polymers include ethylene vinyl acetate (EVA), polytrimethylene-terephthalate, polyethyleneterephthalate, polybutyleneterephthalate, ethylene-carbon monoxide copolymer, polyvinyl-diene flourides, polyphenylenesulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, polyetherester elastomer, polyesterester elastomer, polyetheranide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with a functional group, polymers based on ethylene-propylene-(diene), polymers based on functionalized ethylene-propylene-(diene), dynamically vulcanized polypropylene/ethylene-propylene-diene-copolymer, thermoplastic vulcanizates based on ethylene-propylene-(diene), urethane, thermoplastic polyetherurethane, thermoplastic polyesterurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutyleneoctene.

Examples of suitable polyols for use in the polymeric matrix or base resin of the inner shoe sole and within which the microspheres are encapsulated, include polyester polyols, polyether polyols, polycarbonate polyols, and polybutadiene polyols. Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The gylcols include ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyol is prepared by the ring-opening addition and polymerization of alkylene oxide, e.g., ethylene oxide and propylene oxide, with an initiator of a polyhydric alcohol, e.g., diethylene glycol, which is an active hydride. Specifically, polypropylene glycol (PPG), polyethylene glycol (PEG), or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide, specifically, tetrahydrofuran-propylene oxide copolymer or tetrahydrofuran-ethylene oxide copolymer can be formed. The polyether polyol may be used either alone or in a combination.

Polycarbonate polyol is obtained by the condensation of a known polyol, e.g., polyhydric alcohol, with phosgene, chloroformic acid ester, dialkyl carbonate or diallyl carbonate. Preferred polycarbonate polyol contains a polyol component using 1,6-hexanediol, 1,4-butanediol, 1,3-butanediol, neopentylglycol or 1,5-pentanediol. Polycarbonate polyols can be used either alone or in a combination with other polyols.

Polybutadiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

Detailed examples of isocyanate for use in the polymeric matrix or base resin which becomes the reaction product include trimethylene diisocyanate, tetramethylene diisocyanate, pentamethylene diisocyanate, hexamethylene diisocyanate, ethylene diisocyanate, diethylidene diisocyanate, propylene diisocyanate, butylene diisocyanate, bitolyelene diisocyanate, tolidine isocyanate, isophorone diisocyanate, dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate,2,4,4-trimethyl hexamethylene diisocyanate,2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate,4,4'-methylenebis(cyclohexyl isocyanate),4,4'-methylenebis (phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetramethylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane-4,4'-diisocyanate, 1,4-bis(isocyanatomethyl) cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toulene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolyene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4"-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination. Combination isocyanates include triisocyanates, such as biuret of hexamethylene diisocyanate and triphenylmethane triisocyanates, and polyisocyanates, such as polymeric diphenylmethane diisocyanate.

Examples of suitable material for making the shells of the microspheres 104 includes thermoplastic resin, thermoset resin, thermoplastic elastomer, thermoset rubber, thermoplastic vulcanizates, or mixtures thereof. In cases where the microspheres are microspheres, there is no limitation on the outside diameter of the microspheres. However, it is preferred to have the outside diameter of a microsphere be less than 1,000 μm, more preferably less than 500 μm, and most preferably less than 100 μm.

The microspheres 104 have encapsulated chain extender(s), crosslinking agent(s), or concentrate of those in the shell of each microsphere. The shell of the microspheres can be broken or deformed upon exposure to a predetermined level of pressure, thus, releasing the chain extender(s) or crosslinking into a base resin to form the reaction product. The chain extender(s) can include diol, polyol, diisocyanate, polyisocyanate, diamine, polyamine, dendrimer, urethane prepolymer or mixtures thereof.

Examples of chain extenders in the microspheres 104 include polyols, polyamine compounds, and mixtures thereof. Polyol chain extenders may be primary, secondary, or tertiary polyols. Specific examples of monomers of these polyols include trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol. Diamines also can be added to urethane prepolymer to function as chain extenders. Suitable diamines, for example, include tetramethylenediamine, pentamethylenediamine, hexamethylenediamine, p,p'-methylenedianiline, and p-phenylenediamine. Aromatic diamines have a tendency to provide a stiffer, i.e., having a higher Mooney viscosity, product than aliphatic or cycloaliphatic diamines. Suitable polyamines that can be used as chain extenders include primary, secondary, and tertiary amines, such as diamine, triamine, and tetramine. Example polyamines include an aliphatic amine, such as hexamethylenediamine; an alicycle amine, such as 3,3'-dimethyl-4,4'-diamino-dicyclohexyl methane; or, an aromatic amine, such as 4,4'-methylene bis-2-chloraniline, 2,2', 3,3'-tetrachloro-4,4'-diaminophenyl methane, or 4,4'-diaminodiphenyl; and 2,4,6-tris(dimethylaminomethyl) phenol. These chain extenders can be used either alone or in combination.

The crosslinking agent used in the preparation of this embodiment of the present invention can be organic peroxide, a sulfur compound, or a precious metal-containing material. Preferred crosslinking initiators are radical initiators, such as organic peroxides and organic azo compounds or phenolic crosslinking initiators. Examples of suitable crosslinking agents include aliphatic peroxides, aromatic peroxides, or mixtures thereof. Primary, secondary, or tertiary peroxides can be used. Also, peroxides containing more than one peroxy group can be used, such as 2,5-bis-(ter.butylperoxy)-2,5-dimethyl hexane and 1,4-bis-(ter.butylperoxyisopropyl)-benzene. Also, peroxides that are either symmetrical or asymmetric can be used, such as tert. butylperbenzoate and tert. butylcumylperoxide. Additionally, peroxides having carboxy groups also can be used. Decomposition of peroxides within the scope of the present invention can be brought by applying thermal energy, radiation energy, shear, reactions with other chemical ingredients, or combinations thereof. Homolytically decomposed peroxide, heterolytically decomposed peroxide, or a mixture thereof can be used to promote crosslinking reactions with compositions within the scope of this invention.

Examples of suitable crosslinking agent peroxide compounds include peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperosy)cyclohexane, 1,1-bis(t-butylperoxy)-cyclododecane, 1,1-bis(t-butylperoxy)cyclohexane, 1,4-bis-(t-butylperoxyisopropyl)-benzene, 2,2-bis(t-butylperoxy)octane, n-butyl-4,4-bis(t-butylperoxy)butane, and n-butyl-4,4-bis(t-butylperoxy) valerate; dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy)-diisopropylbenzene, 2,5-dimethyl-2,5-bis(t-butylperoxy)hexane, and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, and m-toluoyl peroxide; peroxy esters such as t-butylperoxy acetate, t-butylperoxy isobutyrate, t-butylperoxy-2-ethyl hexanoate, t-butylperoxy lauroylate, t-butylperoxy benzoate, di-t-butylperoxy isophthalate, 2,5-dimethyl-2,5-di(benzoylperoxy)hexane, t-butylperoxymaleic acid, t-butylperoxyisopropyl carbonate, and cumylperoxy octenoate; and hydroperoxides such as t-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide, and mixtures thereof.

The material composition of the reaction products can further include organic, inorganic, or metallic fillers, and organic, inorganic, or metallic fibers in a form of continuous or non-continuous fibers. The material composition of the reaction products can further include a foaming agent and microspherical fillers, which are solid or filled with air or gas such as $N_2$ or $CO_2$. The composition of each micro-sized enclosure's shell includes organic, inorganic, or metallic material. Furthermore, the material composition of each shell can include colorant, optical brightener, processing aids, anti-oxidant, uv-stabilizer, and mold release.

During processing, the microspheres 104 can be introduced into a resin composition of the reaction product 102 by any known mechanical mixing, melt-mixing, or by use of concentrate with various loading levels and carrier resins. The microspheres can be mixed into each reactant of the reaction product, mixture of each reaction product, or reaction product of each reactant of the reaction product. Any known conventional method for polymer processing can be used with the resin composition in this invention, such as extrusion, injection molding, blow molding, injection-blow molding, transfer molding, compression molding, casting, or combinations thereof.

In a second embodiment, the inner sole 100 includes a silicone material 114 and microspheres 104. The silicone material includes monomeric, oligomeric, prepolymeric, or polymeric silicone with or without additional reinforcing filler. The microspheres include an encapsulated catalyst, crosslinking agent, or concentrate of those in the shell, which is released as a result of applied pressure, as discussed above. The catalyst or crosslinking agent includes sulfur compounds, platinum catalysts, peroxides, alkylalkoxyacyloxysilane, silicone, or other chemical, which has reactive groups that undergo hydrolytic polymerization, chemical component with mercaptoalkyl substituents, or mixtures thereof.

The material composition of the silicone material 114 can further include organic, inorganic, or metallic fillers, and organic, inorganic, or metallic fibers in a form of continuous or non-continuous fibers. Also, the material composition of the silicone material can include a foaming agent. Furthermore, the material composition of the silicone material can include microspherical fillers, which are solid or filled with air or gas such as $N_2$ or $CO_2$. The composition of the shells that make up the microspheres 104 includes organic, inorganic, or metallic material. The material composition of the microspheres can further include colorant, optical brightener, processing aids, anti-oxidant, uv-stabilizer, and mold release.

The silicone material 114 used in the present embodiment of the invention can be a monomer, oligomer, prepolymer, or polymer with or without additional reinforcing filler. Furthermore, the monomer, oligomer, prepolymer, or polymer can include repeating SiO units in the chain backbone. One example of the silicone material is polydimethylsiloxane (PDMS). Another type of silicone material suitable for use in the present invention is one having hydrocarbon groups that lack aliphatic unsaturation. Yet another type of silicone material suitable for use in the present invention is one having functional groups, for example, carboxylic, epoxy, hydroxyl, and maleic anhydride.

Another type of silicone material 114 utilized in the present embodiment of the invention can have at least 1 alkenyl group having at least 2 carbon atoms in their molecules. Examples of these alkenyl groups include, but are not limited to, vinyl, allyl, butenyl, pentenyl, hexenyl, and decenyl. The alkenyl functionality can be located at any location of the silicone structure, including one or both terminals of the structure.

The remaining, non-alkenyl, silicon-bonded organic groups in the silicone material 114 are selected from hydrocarbon or halogenated-hydrocarbon groups that contain no aliphatic unsaturation. Non-limiting examples include alkyl groups such as methyl, ethyl, propyl, butyl, pentyl, and hexyl; cycloalkyl groups such as cyclohexyl and cycloheptyl; aryl groups such as phenyl, tolyl, xylyl; aralkyl groups such as benzyl and phenethyl; and halogenated alkyl groups such as 3,3,3-trifluoropropyl and chloromethyl.

Specific examples of suitable silicones for use in the present invention include trimethylsiloxy-endblocked dimethylsiloxane-methylhexenylsiloxane copolymers, dimethylhexenlylsiloxy-endblocked dimethylsiloxane-methylhexenylsiloxane copolymers, trimethylsiloxy-endblocked dimethylsiloxane-methylvinylsiloxane copolymers, trimethylsiloxy-endblocked methylphenylsiloxane-dimethylsiloxane-methylvinylsiloxane copolymers, dimethylvinylsiloxy-endblocked dimethylpolysiloxanes, dimethylvinylsioxy-endblocked dimethylsiloxane-methylvinylsiloxane copolymners, dimethylvinylsiloxy-endblocked methylphenylpolysiloxanes, dimethylvinylsiloxy-endblocked methylphenylsiloxane-dimethylsiloxane-methylvinylsiloxane copolymers, and similar copolymers wherein at least one end group is dimethylhydroxysiloxy.

Examples of suitable material for making the shells of the microspheres 104, e.g., microspheres, include thermoplastic resin, thermoset resin, thermoplastic elastomer, thermoset rubber, thermoplastic vulcanizates, or mixtures thereof. In the case of microspheres, there is no limitation on the outside diameter of the microsphere, however, it is preferred that the outside diameter of an unexpanded microsphere be less than 1000 µm, more preferably less than 500 µm, and most preferably less than 100 µm.

The crosslinking agent used in the preparation of this embodiment of the present invention can be organic peroxide, a sulfur compound, or a precious metal-containing material. Precious metal-containing catalysts can be based on the following metals: rhodium, ruthenium, palladium, osmium, irridium, or platinum. In particular, a platinum metal complex can be employed as the catalyst. Preferred crosslinking initiators are radical initiators, such as organic peroxides and organic azo compounds or phenolic crosslinking initiators. Examples of suitable crosslinking agents include aliphatic peroxides, aromatic peroxides, or mixtures thereof. Primary, secondary, or tertiary peroxides can be used. Also, peroxides containing more than one peroxy group can be used, such as 2,5-bis-(ter.butylperoxy)-2,5-dimethyl hexane and 1,4-bis-(ter.butylperoxyisopropyl)-benzene. Also, peroxides that are either symmetrical or asymmetric can be used, such as tert.butylperbenzoate and tert.butylcumylperoxide. Additionally, peroxides having carboxy groups also can be used. Decomposition of peroxides within the scope of the present invention can be brought by applying thermal energy, radiation energy, shear, reactions with other chemical ingredients, or combinations thereof. Homolytically decomposed peroxide, heterolytically decomposed peroxide, or a mixture thereof can be used to promote crosslinking reactions with compositions within the scope of this invention.

Examples of suitable crosslinking agent peroxide compounds include peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperosy)cyclohexane, 1,1-bis(t-butylperoxy)-cyclododecane, 1,1-bis(t-butylperoxy)cyclohexane, 1,4-bis-(t-butylperoxyisopropyl)-benzene, 2,2-bis(t-butylperoxy)octane, n-butyl-4,4-bis(t-butylperoxy)butane, and n-butyl-4,4-bis(t-butylperoxy) valerate; dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy)-diisopropylbenzene, 2,5-dimethyl-2,5-bis(t-butylperoxy)hexane, and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, and m-toluoyl peroxide; peroxy esters such as t-butylperoxy acetate, t-butylperoxy isobutyrate, t-butylperoxy-2-ethyl hexanoate, t-butylperoxy lauroylate, t-butylperoxy benzoate, di-t-butylperoxy isophthalate, 2,5-dimethyl-2,5-di(benzoylperoxy)hexane, t-butylperoxymaleic acid, t-butylperoxyisopropyl carbonate, and cumylperoxy octenoate; and hydroperoxides such as t-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide, and mixtures thereof.

Examples of suitable crosslinking agent sulfur compounds include sulfur donors and soap sulfurs. Examples of suitable sulfur compounds include dithiodimorpholine (DTDM), caprolactamdisulfide, N,N'-dithio bis-(hexahydro-2H-azepinone), 2-morpholino-dithio-benzothiazole, dipentamethylene thiuramtetrasulfide, N-oxydiethylene dithiocabamyl-N'-oxydiethylene sulfeamide, tetramethyl thiuramdisulfide, 2-mercaptobenzothiazole, zinc-2-mercaptobenzothiazole, dibenzothiazyl disulfide, N-cyclohexyl-2-benzothiazylsulfenamide, N-ter-butyl-2-benzothiazylsulfenamide, 2-benzothiazyl-N-sulfenemorpholide, N,N-dicyclohexyl-2-benzothiazylsulfenamide, tetramethylthiuram disulfide, tetramethylthiuram monosulfide, tetraethylthiuram disulfide, dimethyldiphenylthiuram disulfide, dipentamethylenethiuram tetrasulfide, zinc dimethyldithiocarbamate, zinc diethyldithicarbamate, zinc dibutyldithiocarbamate, zinc pentamethylenedithiocarbamate, zinc ethylpheyldithiocarbamate, zinc ethylphenyldithicarbamate, zinc dibenzyldithiocarbamate, piperadine pentamethylenedithiocarbamate, sodium dimethyldithiocarbamate, sodium dibutyldithiocarbamate, selenium dimethyldithiocarbamate, lead dimethyldithiocarbamate, cadmium dimethyldithiocarbamate, cadmium pentamethylenedithiocarbamate, copper dimethyldithiocarbamate, copper dibutyldithiocarbamate, bismuth dimethyldithiocarbamate, dithiocarbamylsulfenamide, N-oxydiethylenedithiocarbamyl-N'-oxydiethylenesulfenamide, N,N'-ethylenethiourea, N,N-diphenylthiourea, N,N'-diethylthiourea, zinc dibutyldithiophosphate, copper diisopropyldithiophosphate, 2-benzothiazole-N-morpholyldisulfide, and dimorpholine disulfide zinc acrylate, and mixtures thereof.

Examples of a suitable crosslinking agent comprise chemicals with silicone with mercaptoalkyl substituents. Crosslinking also can occur by oxidation of mercaptoalkyl substituents upon contact with molecular oxygen. The major polymer component is a linear or lightly branched silicone having mercaptoalkyl substituents, such as a 3-mercaptopropyl bonded directly to the silicon. Crosslinker components are optional and are usually low molecular weight silicones having three or more mercaptoalkyl substituents per molecule. Catalysts can include organic compounds of pro-oxidant metals such as cobalt.

Examples of suitable crosslinking agents comprise chemical or polymeric components that have reactive groups for hydrolytic polymerization. Furthermore, crosslinking can result from moisture reactions where the major polymer component is a linear or lightly branched silicone having reactive groups that readily undergo hydrolytic polymerization to form siloxanes. The reactive groups that readily undergo hydrolytic polymerization can be present in terminal positions, non-terminal positions, or both. The crosslinking agents usually prossess three or more identical reactive groups per molecule. A wide variety of catalysts can be used, such as metal and amino carboxylate salts.

Examples of switchable crosslinking agents comprise alkylalkoxyacyloxysilane. Compositions of a crosslinking agent or concentrate include an alkylalkoxyacyloxysilane selected from the group including $R^1SiR^2_aR^3{}_{3-a}$, $R^4R^5_bR^6{}_{3-b}$ Si—O—$R^7R^8_cR^9{}_{3-c}$, and mixtures thereof; where $R^1$, $R^4$, and $R^7$ are independently selected from the group of alkyl radicals having the formula $(CH_2)_n X$, where n has 1 to 10 carbon atoms, and X is selected from the group including hydrogen, amino, epoxy, cyano, thiocyano, allyl, and vinyl; $R^2$, $R^5$, and $R^8$ are independently selected from the group of acyloxy radicals having the formula $OC(O)(CH_2)_m H$, where m has 1 to 8 carbon atoms; and $R^3$, $R^6$, and $R^9$ are independently selected from the group of alkoxy radicals or mixture of alkoxy radicals of 1 to 10 carbon atoms wherein the subscripts a, b, and c are subject to the following limitations: $0<a<3$, $0<b<3$, and $0<c<3$.

A crosslinking agent or concentrate can comprise: (A) from approximately 1 to approximately 99 weight percent of silanol stopped (terminated) polydimethylsiloxane; (B) from approximately 1 to approximately 99 weight percent of a silanol stopped polydimethylsiloxane; (C) from approximately 0.1 to approximately 100 weight percent of an alkylalkoxyacyloxysilane crosslinking compound selected from the group including $R^1SiR^2_aR^3{}_{3-a}$, and $R^4R^5_bR^6{}_{3-b}$ Si—O—$SiR^7R^8_c c^9{}_{3-c}$, and mixtures thereof; where $R^1$, $R^4$, and $R^7$ are independently selected from the group of alkyl radicals having the formula $(CH_2)_n X$, where n has 1 to 10 carbon atoms, and X is selected from the group including hydrogen, amino, epoxy, cyano, thiocyano, allyl, and vinyl; $R^2$, $R^5$, and $R^9$ are independently selected from the group of alkoxy radicals having the formula $OC(O)(CH_2)_m H$, where m has 1 to 8 carbon atoms; and $R^3$, $R^6$, and $R^9$ are independently selected from the group of alkoxy radicals or mixture of alkoxy radicals of 1 to 10 carbon atoms wherein the subscripts a, b, and c are subject to the following limitations: $0<a<3$, $0<b<3$, and $0<c<3$; and (D) from approximately 0.01 to approximately 10 weight percent of a tin condensation cure catalyst selected from the group including dibutyltindilaurate, dibutyltindiacetate, dibutyldibutoxytin, dibutyldimethoxytin, and dibutyldineodecanoatetin.

During processing, the microspheres 104 can be introduced into a resin composition of the silicone material 114 by any known mechanical mixing, melt-mixing, or by use of concentrate with various loading levels and carrier resins. The microspheres can be mixed into each reactant of the silicone material, each mixture of silicone material, or each reaction product of each silicone material reactant. Any known conventional method for polymer processing can be used to make a shoe or shoe component with resin composition in this invention, such as extrusion, injection molding, blow molding, injection-blow molding, transfer molding, compression molding, casting, or combinations thereof.

In a third embodiment, the inner sole 100 includes a shoe-making composition (not shown) having a responsive polymer network or aggregation (not shown) and defined as one that changes Theological and mechanical properties reversibly by an applied stimulus with or without volumetric changes. The shoe-making composition can be coated onto, included in, or enclosed in any type of container or shoe component made of a thermoplastic or thermoset resin which is a reaction product monomer, oligomer, prepolymer, polymer, or blends thereof.

The shoe-making composition (not shown) is enclosed in a single or multiple chambers (not shown) in a shoe component (not shown). The shoe-making composition is enclosed in a reservoir (not shown) and transferred into another chamber or chambers (not shown) by a passageway(s) (not shown). The shoe-making composition is used together with a foamed material, having interconnected, or isolated, closed cells. The shoe-making composition brings changes in viscosity and/or in modulus with or without volumetric changes, upon exposure to an environmental stimulus, such changes in irradiation, temperature, moisture, ionic strength, pH, solvent composition, or combinations thereof.

The material composition of the shoe-making composition (not shown) can comprise organic, inorganic, or metallic fillers. Also, the material composition of the shoe-making composition comprises organic, inorganic, or metallic fibers in a form of continuous or non-continuous fibers. Furthermore, the material composition of the shoe-making composition can include microspherical fillers which are filled with air or gas such as $N_2$ or $CO_2$. The material composition can comprise colorant, optical brightener, processing aids, antioxidant, uv-stabilizer, and mold release.

An example of a responsive gel for use in the shoe-making composition (not shown) of the present embodiment comprises polyoxyalkylene, wherein at least one polyoxyalkylene unit has hydrophobic characteristics and at least one polyoxyalkylene unit has hydrophilic characteristics. The composition of polyoxyalkylene comprises a triblock polymer of polyoxyethylene and polyoxypropylene, which can be represented as (POP)x(POE)y(POP)z where x, y, z are number of repeating units.

Components of the responsive gel have functional mono-, bi-, or multi-functional groups including hydroxyl, acid, or amine side groups. Also, responsive gel compositions can comprise polyacrylic acid, poly(alkyl-co-oxyalkylene), polyacrylamide, and aqueous solvent. The solvent can be either polar or non-polar. The responsive gel composition further comprises an organic solvent with or without pH adjustment. The composition of the responsive gel may undergo phase separation or phase transition upon exposure to an environmental stimulus. Suitable exemplary materials for making the responsive gel include Pluronics or Poloxamers.

EXAMPLES

The following Expancel® microsphere grades (consisting of a hydrocarbon gas encapsulated within a thermoplastic (acrylonitrile/methacrylonitrile copolymer) shell) were used for the Examples.

820 DU 40 is an unexpanded, dry grade with an expanded weight average diameter of 10–16 um, an activation temperature range of 75–80° C., and a maximum temperature range of 115–125° C.

098 DU 120 is an unexpanded, dry grade with an expanded weight average diameter of 30–40 um, an activation temperature range of 150–170° C., and a maximum temperature range of 210–230° C.

The following thermoset polymers and polymer precursors were used as the polymer matrix for the Examples.

The Bayflex® 956 polyurethane system consists of two liquid components. Component A is a diphenylmethane diisocyanate (MDI) based pre-polymer and component B is a polyether polyol system. The specification of these components is obtainable from Bayer Polymers Division (product code U956).

The following thermoplastic polymers were used as the polymer matrix for the Examples.

The thermoplastic polyurethane, TPR-14, is supplied by Framas, China under the code, PO-TPR00014.

The thermoplastic EVA resin, EVA-17, is supplied by O-T, China under the code, PO-EVA00017.

The following equipment was used to generate the experimental data: Wallace® Electronic Densimeter X.21B. Carver® Laboratory Press Model M. Engineering Company Ltd. Scientific LabTech® mill. FlackTek Inc. DAC 400 FV Speed Mixer™. Instron Shore® Instruments: Automatic Operating Stand Model 902. DSC 2820 Modulated DCS: TA Instruments. Two piece rectangular steel mold with rounded edges (inner dimensions: 20.5 cm×12.75 cm×0.25 cm). Aluminum spacer with rounded edges (inner dimensions: 7.5 cm×10 cm×1.75 cm). Two aluminum plates (dimensions: 20.5 cm×21 cm×1 cm). Aramid rectangular sheets (dimensions: 20.5 cm×20.5 cm). Fischer® Scientific heating oven. Cylindrical mixing cups (dimensions: 6.3 cm diameter×5.8 cm height). Stoner® Urethane Mold Release (E236).

In order to optimize foaming in the thermoset PU resins, the following process conditions were considered: Expancel® weight percentage, mold temperature, press pressure, and material delivery method into mold. In order to optimize foaming in the thermoplastic PU and thermoplastic EVA materials, the following process conditions were considered: Expancel® weight percentage, pressing temperature, pressing time, and mass of material introduced into mold.

The final foams exhibited a good balance of density, and hardness. Although the hardness of the polymer base matrix is constant, the voids of the cellular structure of a foam allow for differences in resistances when the hardness apparatus tip is pressed into the sample. Thus hardness is qualified as a resistance of a foamed sample to indentation.

The processing conditions for three types of polymeric foams (thermoset PU, thermoplastic PU, and thermoplastic EVA) were examined. Three different shoe-grade resins were tested: an EVA resins (EVA-17), a thermoplastic PU resin (TPR-14), and a thermoset PU resin (Bayflex® 956). The two categories of polymers (thermoplastics and thermosetting resins) were foamed with different processing procedures. However, the two main components of each procedure are dispersion of the Expancel® microspheres into the polymer matrix and heat activation of the microspheres to produce the foam.

Shoe-Grade Thermosetting Resins

For the Bayflex® 956 polyurethane (PU) system, a predetermined weight percentage (0–12%) of Expancel® 820 DU 40 microspheres was mixed into the pre-polymer (component A). Mixing occurred in plastic cylindrical mixing cups with the FlackTek Speed Mixer™ for 20 seconds at 2750 revolutions per minute. The component A (with added Expancel®) was then mixed in stiochiometry with the polyol (component B). Mixing of pre-polymer (component A) and polyol (component B) occurred in the FlackTek Speed Mixer™ for 20 seconds at 2750 revolutions per minute. All experimental tests were completed with a constant component A to component B mass mixture ratio of 74:100, as was recommended by Bayer®. In Table 4, all Expancel® concentrations are given in terms of the total pre-polymer and polyol mass. The resultant pre-polymer and polyol mixture was then poured into the following setup.

The mold used to form the shoe grade PU plaque consists of two pieces. The first piece is a rectangular steel mold with rounded edges (inner dimensions: 20.5 cm×12.75 cm×0.25 cm). The second piece is a steel plate (dimensions 21 cm×21 cm×0.2 cm) that fits onto the first piece to ensure mold closure. The internal faces of the steel mold were lightly spray coated with Stoner® urethane mold release (E236). The role of the mold release was to ensure that solidified PU plaque could be easily removed from the mold. The two-piece steel mold was fitted into the press and pre-heated to the desired temperature (ranging from 60–150° C.) before pouring of the pre-polymer and polyol mixture into the mold. The pre-polymer and polyol mixture was cured in the heated mold so that microsphere expansion occurs simultaneously with the step-growth polymer synthesis.

Two pressure conditions were used to produce shoe-grade PU plaques. First, in order to determine the amount of material required to fill the volume of the mold, foaming was completed under atmospheric pressure. In this case, the second piece of the mold was not used to cover the first rectangular piece. After calculating the masses of the desired components needed to produce a full plaque at certain conditions, a different procedure was utilized. The mixed components were poured into the mold, and the covered mold was maintained closed under a pressure of about 396 kPa. In this pressurized environment, the PU foam was restrained to expand only within the mold.

Prior to usage, the pre-polymer (component A) was stored in a Fischer® Scientific heating oven set at 50° C.; the Expancel® 820 DU 40 and the polyol (component B) were stored at room temperature. The polymer plaques produced were aged at room temperature for 24 hours, and the specific gravity of each sample was then measured using a densimeter. The specific gravity measurements taken for each plaque produced are given in Table 1. One Shore A hardness measurement was taken near the center of the top face of each plaque produced and is reported in Table 1. It should also be noted that hardness values are representative of the surface layer for each sample.

Analysis of the data in Table 1 demonstrate that the microsphere reagent (820 DU 40) in Bayflex® 956 shoe-grade PU shows saturation near the 3–5% loading levels. The data also show that the hardness is roughly linearly correlated with specific gravity for Bayflex® 956. For a 5% and 100° C. condition the Shore A hardness of the foam will be approximately 50.

TABLE 1

Bayflex ® 956 Polyurethane Specific Gravity & Hardness Results*

| Ex # | 820 DU 40 (pph) | Curing Temp (° C.) | Sp. Gravity | Shore A Hardness |
|---|---|---|---|---|
| Comp Ex 1 | 0 | 60 | 1.15 | 84 |
| Ex 1 | 1 | 60 | 0.96 | 71 |
| Ex 2 | 3 | 60 | 0.86 | 42 |
| Ex 3 | 5 | 60 | 0.57 | 45 |
| Ex 4 | 7 | 60 | 0.79 | 30 |
| Comp Ex 2 | 0 | 80 | 1.14 | 84 |
| Ex 5 | 1 | 80 | 1.00 | 72 |
| Ex 6 | 3 | 80 | 0.64 | 50 |
| Ex 7 | 5 | 80 | 0.57 | 47 |
| Ex 8 | 7 | 80 | 0.41 | 42 |
| Comp Ex 3 | 0 | 100 | 1.15 | 83 |
| Ex 9 | 1 | 100 | 0.99 | 74 |
| Ex 10 | 3 | 100 | 0.60 | 60 |
| Ex 11 | 5 | 100 | 0.53 | 47 |
| Ex 12 | 7 | 100 | 0.65 | 40 |
| Comp Ex 4 | 0 | 120 | 1.13 | 85 |
| Ex 13 | 1 | 120 | 0.87 | 70 |
| Ex 14 | 3 | 120 | 0.53 | 57 |
| Ex 15 | 5 | 120 | 0.61 | 47 |
| Ex 16 | 7 | 120 | 0.49 | 44 |

*For shoe-grade thermoset polyurethane (Bayflex ® 956), a predetermined weight percentage (0–7%) of Expancel ® microspheres was mixed in with the diisocyanate pre-polymer (Component A). Component A was then mixed with the polyol (Component B) in a 74:100 A:B weight ratio. All samples produced were foamed under the atmospheric pressure condition. The resultant pre-polymer & curative mixture was heat pressed (temperatures ranging from 60–150° C.).

Shoe-Grade Thermoplastic Resins

For thermoplastic polyurethane (TPR-14) and ethyl vinyl acetate (EVA-17) pellets or sheets of polymer were pre-heated close to their glass transition temperatures (120–130° C. for TPR-14, 130–140° C. for EVA-17) so that the materials' viscosity decreased to a point where it could be milled. During the milling process, different weight percentages of Expancel® microspheres were well mixed into the polymer sheet. For each thermoplastic material, five Expancel® loading levels (0, 2, 4, 6, and 10%) were tested. The Expancel® grade that was chosen for foaming the TPU and EVA materials was 098 DU 120. This grade has an activation temperature range of 150–170° C. and a maximum temperature range of 210–230° C. The sheets were pulled out of the mill and left to cool to room temperature.

The three temperature foaming conditions that were chosen to give an adequate distribution were 150, 180, and 210° C. The two-piece rectangular mold (inner dimensions: 20.5 cm×12.75 cm×0.25 cm) was pre-heated to the desired temperature and lightly spray coated with Stoner® Urethane mold release. Samples were then cut from each weight percentage polymer sheet and pressed into plaques in the heated mold at the three temperatures conditions to activate the foaming agent. Table 2 and 3 show the results of these 15 different loading level/foaming temperature conditions for each of the thermoplastic materials.

All plaques were made with the mold maintained closed under a pressure of 396 kPa. The amount of material introduced into the mold was varied to optimize foaming. The time that the material was exposed to the heated mold varied upon the temperature condition used. The polymer plaques were then water quenched to room temperature and air dried overnight. The specific gravity of each sample was measured using a densimeter. Specific gravity measurements of samples of each weight percentage without heat pressing were taken and used as references. One Shore A hardness measurement was taken near the center of the top face of each plaque produced; these values are reported in Tables 2 and 3 for each resin. It should also be noted that hardness values are representative of the surface layer for each sample.

TABLE 2

TPR-14 Thermoplastic Polyurethane Specific Gravity & Hardness Results*

| Ex # | 098 DU 120 (pph) | Curing Temp (° C.) | Press Time (min) | Sp. Gravity | Shore A Hardness |
|---|---|---|---|---|---|
| Comp Ex 1 | 0 | 150 | 6 | 0.90 | 48 |
| Ex 1 | 2 | 150 | 6 | 0.74 | 47 |
| Ex 2 | 4 | 150 | 6 | 0.60 | 42 |
| Ex 3 | 6 | 150 | 6 | 0.49 | 39 |
| Ex 4 | 10 | 150 | 6 | 0.40 | 41 |
| Comp Ex 2 | 0 | 180 | 1.5 | 0.90 | 46 |
| Ex 5 | 2 | 180 | 1.5 | 0.64 | 42 |
| Ex 6 | 4 | 180 | 1.5 | 0.55 | 39 |
| Ex 7 | 6 | 180 | 1.5 | 0.45 | 40 |
| Ex 8 | 10 | 180 | 1.5 | 0.34 | 37 |
| Comp Ex 3 | 0 | 210 | 0.5 | 0.87 | 47 |
| Ex 9 | 2 | 210 | 0.5 | 0.60 | 41 |
| Ex 10 | 4 | 210 | 0.5 | 0.49 | 40 |
| Ex 11 | 6 | 210 | 0.5 | 0.40 | 38 |
| Ex 12 | 10 | 210 | 0.5 | 0.37 | 34 |

*For shoe-grade thermoplastic polyurethane TPR-14, pellets of polymer are pre-heated close to the glass transition temperature (120–130° C.) so the material could be milled. During the milling process, a predetermined weight percentage (0–10%) of Expancel ® 098 DU 120 microspheres were well mixed into the polymer sheets. Samples were then cut from each sheet and heated in a press at three different temperatures (150, 180, and 210° C.).

Analysis of the data in Table 2 demonstrates that the saturation point of the microsphere reagent occurs near the 10% loading level with a foamed density of 0.37 g/cc. Little difference in foam properties was found with respect to foaming temperature. Again, the foam hardness is correlated in a linear fashion with foam specific gravity. For a 10% loading and 180° C. processing temperature, the Shore A hardness of the foam will be approximately 37.

TABLE 3

EVA-17 Thermoplastic EVA Specific Gravity & Hardness Results*

| Ex # | 098 DU 120 (pph) | Curing Temp (° C.) | Press Time (min) | Sp. Gravity | Shore A Hardness |
|---|---|---|---|---|---|
| Comp Ex 1 | 0 | 150 | 7.0 | 0.98 | 84 |
| Ex 1 | 2 | 150 | 7.0 | 0.78 | 83 |
| Ex 2 | 4 | 150 | 7.0 | 0.51 | 78 |
| Ex 3 | 6 | 150 | 7.0 | 0.32 | 61 |

TABLE 3-continued

EVA-17 Thermoplastic EVA Specific Gravity & Hardness Results*

| Ex # | 098 DU 120 (pph) | Curing Temp (° C.) | Press Time (min) | Sp. Gravity | Shore A Hardness |
|---|---|---|---|---|---|
| Ex 4 | 10 | 150 | 7.0 | 0.26 | 59 |
| Comp Ex 2 | 0 | 180 | 2.0 | 0.98 | 85 |
| Ex 5 | 2 | 180 | 2.0 | 0.63 | 69 |
| Ex 6 | 4 | 180 | 2.0 | 0.41 | 50 |
| Ex 7 | 6 | 180 | 2.0 | 0.37 | 60 |
| Ex 8 | 10 | 180 | 2.0 | 0.27 | 58 |
| Comp Ex 3 | 0 | 210 | 0.5 | 0.97 | 83 |
| Ex 9 | 2 | 210 | 0.5 | 0.53 | 67 |
| Ex 10 | 4 | 210 | 0.5 | 0.33 | 60 |
| Ex 11 | 6 | 210 | 0.5 | 0.33 | 56 |
| Ex 12 | 10 | 210 | 0.5 | 0.26 | 52 |

*For thermoplastic ethyl vinyl acetate EVA-17, sheets of polymer were pre-heated close to the glass transition temperature (130–140° C.) so the material could be milled. During the milling process, a predetermined weight percentage (0–10%) of Expancel ® 098 DU 120 microspheres were well mixed into the polymer sheets. Samples were then cut from each sheet and heated in a press at three different temperatures (150, 180, and 210° C.).

Analysis of the data in Table 3 demonstrates that the saturation point of the microsphere reagent occurs near the 8% loading level with a foamed density of 0.26 g/cc. Little difference in foam properties was found with respect to foaming temperature. Again, the foam hardness is correlated in a linear fashion with foam specific gravity. For an 8% loading and 180° C. processing temperature condition, the Shore A hardness of the foam will be approximately 56.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A shoe comprising an inner sole, the inner sole comprising:
   a. polymeric microspheres, each polymeric microsphere having a diameter less than 1000 microns, the polymeric microspheres including a polymeric outer shell and an encapsulated curing agent within the polymeric outer shell; and
   b. a polymeric matrix including a polymer having substituents on the polymer chain selected from the group consisting of alcohols including diols mid polyols, isocyanates, amines, and any and all mixtures thereof;
   c. wherein the inner sole is configured such that wearing of the shoe causes the polymeric outer shells of at least some of the polymeric microspheres to rupture, thereby releasing the encapsulated curing agent and causing the curing agent to react with the polymer of the polymer matrix.

2. The shoe according to claim 1, wherein the polyol in the polymeric matrix is selected from the group consisting of polyester polyols, polyether polyols, polycarbonate polyols, polybutadiene polyols, and any and all mixtures thereof.

3. The shoe according to claim 1, wherein the isocyanate in the polymeric matrix is selected from the group consisting of trimethylene diisocyanate, tetramethylene diisocyanate, pentamethylene diisocyanate, hexamethylene diisocyanate, ethylene diisocyanate, diethylidene diisocyanate, propylene diisocyanate, butylene diisocyanate, bitolyelene diisocyanate, tolidine isocyanate, isophorone diisocyanate, dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate,2,4,4-trimethyl hexamethylene diisocyanate,2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate,4,4'-methylene-bis(cyclohexyl isocyanate),4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetramethylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane-4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toulene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolyene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4''-triisocyanate, isocyanatoethyl methacrylate, 3-isopropenyl-.alpha.,.alpha.-dimethylbenzyl-isocyanate, dichlorohexamethylene diisocyanate, .omega.,.omega.'-diisocyanato-1,4-diethylbenzene, polymethylene polyphenylene polyisocyanate, isocyanurate modified compounds, carbodiimide modified compounds, biuret modified compounds of the above polyisocyanates, and any and all mixtures thereof.

4. The shoe according to claim 1, wherein:
   a. each of the polymeric microspheres has a diameter less than 100 microns; and
   b. the isocyanate in the polymeric matrix is selected from the group consisting of tetramethylene diisocyanate, hexamethylene diisocyanate, propylene diisocyanate, isophorone diisocyanate, 2,4,4-trimethyl hexamethylene diisocyanate, 2,2,4-trimethyl hexamethylene diisocyanate, 1,4-cyclohexane diisocyanate,4,4'-methylenebis(cyclohexyl isocyanate),4,4'-methylenebis(p-phenyl isocyanate), dicyclohexylmethane-4,4'-diisocyanate, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 2,4-toulene diisocyanate, 2,4'-diphenylmethane diisocyanate, 4,4'-diphenylmethane diisocyanate, p,p'-diphenylmethane diisocyanate1,4-naphthylene diisocyanate, and any and all mixtures thereof.

5. The shoe according to claim 1, wherein:
   a. each of the polymeric microspheres has a diameter less than 100 microns; and b. the polyol in the polymeric matrix is selected from the group consisting of polyester polyols, polyether polyols, polycarbonate polyols, polybutadiene polyols and any and all mixtures thereof.

6. The shoe according to claim 1, wherein: a. each of the polymeric microspheres has a diameter less than 500 microns; and b. the curing agent is selected from the group consisting of a chain extender, a crosslinking agent, and mixtures thereof.

7. The shoe according to claim 6, wherein:
   a. each of the polymeric microspheres has a diameter less than 100 microns; and
   b. the cross linking agent is selected from the group consisting of organic peroxides, sulfur compounds, and a precious metal-containing materials.

8. The shoe according to claim 6, wherein:
   a. each of the polymeric microspheres has a diameter less than 100 microns; and
   b. the chain extender is selected form the group consisting of diols, polyols, diisocyanates, polyisocyanates, diamines, polyamines, dendrimers, urethane prepolymers, and any and all mixtures thereof.

9. The shoe according to claim 1, further comprising at least one additional component selected from the group consisting of organic, inorganic, or metallic fillers, organic, inorganic, or metallic fibers in the form of continuous or non-continuous fibers, fatty acids, fatty acid salts, catalysts, activators, co-activators, crosslinking agents, co-crosslinking agents, accelerators, co-accelerators, retardants, vulcanizing agents, colorants, optical brightener, uv stabilizers, anti-oxidants, processing aids, mold release agents, and any and all combinations thereof.

10. A shoe comprising an inner sole, the inner sole comprising:
    a. polymeric microspheres, each of the polymeric microspheres having a diameter less than 1000 microns, the polymeric microspheres including a polymeric outer shell end an encapsulated catalyst within the polymeric outer shell; and
    b. a polymeric matrix including a silicone material;
    c. wherein the inner sole is configured such that wearing of the shoe causes the polymeric outer shells of at least some of the polymeric microspheres to rupture, thereby releasing the encapsulated catalyst and causing the polymer of the polymer matrix to react.

11. The shoe according to claim 1, wherein:
    a. each of the polymeric microspheres has a diameter less than 500 microns;
    b. the encapsulated catalyst includes a precious metal selected from the group consisting of rhodium, ruthenium, palladium, osmium, iridium, platinum, and any and all mixtures thereof; and
    c. the silicone material in the polymeric matrix is selected from the group consisting of trimethylsiloxy-endblocked dimethylsiloxane-methylhexenylsiloxane copolymers, dimethylhexenlylsiloxy-endblocked dimethylsiloxane-methylhexenylsiloxane copolymers, trimethylsiloxy-endblocked dimethylsiloxane-methylvinylsiloxane copolymers, trimethylsiloxy-endblocked methylphenylsiloxane-dimethylsiloxane-methylvinyl-siloxane copolymers, dimethylvinylsiloxy-endblocked dimethylpolysiloxanes, dimethylvinylsioxy-endblocked dimethylsiloxane-methylvinylsiloxane copolymers, dimethylvinylsiloxy-endblocked methylphenylpolysiloxanes, dimethylvinylsiloxy-endblocked methylphenylsiloxane-dimethylsiloxane-methylvinylsiloxane copolymers, and any and all mixtures thereof.

12. The shoe according to claim 11, further comprising at least one additional component selected from the group consisting of organic, inorganic, or metallic fillers, organic, inorganic, or metallic fibers in the form of continuous or non-continuous fibers, fatty acids, fatty acid salts, catalysts, activators, co-activators, crosslinking agents, co-crosslinking agents, accelerators, co-accclerators, retardants, vulcanizing agents, colorants, optical brightener, uv stabilizers, anti-oxidants, processing aids, mold release agents, and any and all combinations thereof.

13. A shoe comprising an inner sole, the inner sole comprising:
    a. polymeric microspheres, each of the polymeric microspheres having a diameter less than 1000 microns, the polymeric microspheres including a polymeric outer shell end an encapsulated catalyst within the polymeric outer shell; and
    b. a polymeric matrix including a silicone material;
    c. wherein the inner sole is configured such that wearing of the shoe causes the polymeric outer shells of at least some of the polymeric microspheres to rupture, thereby releasing the encapsulated catalyst and causing the polymer of the polymer matrix to react.

14. The shoe according to claim 13, wherein:
    a. each of the polymeric microspheres has a diameter less than 500 microns;
    b. the encapsulated crosslinking agent is selected from the group consisting of organic peroxides, sulfur compounds, and any and all mixtures thereof; and
    c. the silicone material in the polymeric matrix is selected from the group consisting of trimethylsiloxy-endblocked dimethylsiloxane-methylhexenylsiloxane copolymers, dimethylhexenlylsiloxy-endblocked dimethylsiloxane-methylhexenylsiloxane copolymers, trimethylsiloxy-endblocked dimethylsiloxane-methylvinylsiloxane copolymers, trimethylsiloxy-endblocked methylphenylsiloxane-dimethylsiloxane-methylvinyl-siloxane copolymers, dimethylvinylsiloxy-endblocked dimethylpolysiloxanes, dimethylvinylsioxy-endblocked dimethylsiloxane-methylvinylsiloxane copolymers, dimethylvinylsiloxy-endblocked methylphenylpolysiloxanes, dimethylvinylsiloxy-endblocked methylphenylsiloxane-dimethylsiloxane-methylvinylsiloxane copolymers, and any and all mixtures thereof.

15. The shoe according to claim 14, further comprising at least one additional component selected from the group consisting of organic, inorganic, or metallic fillers, organic, inorganic, or metallic fibers in the form of continuous or non-continuous fibers, fatty acids, fatty acid salts, catalysts, activators, co-activators, crosslinking agents, co-crosslinking agents, accelerators, co-accelerators, retardants, vulcanizing agents, colorants, optical brightener, uv stabilizers, anti-oxidants, processing aids, mold release agents, and any and all combinations thereof.

* * * * *

UNITED STATES PATENT AND TRADEMARK OFFICE
CERTIFICATE OF CORRECTION

PATENT NO. : 7,073,277 B2 Page 1 of 1
APPLICATION NO. : 10/877625
DATED : July 11, 2006
INVENTOR(S) : Erb et al.

It is certified that error appears in the above-identified patent and that said Letters Patent is hereby corrected as shown below:

At column 10, line 58, "polyetheranide" should be -- polyetheramide --.

At column 18, line 31, "Theological" should be -- Rheological--.

At column 23, line 52, "mid" should be --and --.

At column 25, line 38, "end" should be -- and --.

At column 26, line 12, "co-accclerators" should be --co-accelerators --;

, line 21, "catalyst" should be -- crosslinking agent --;

, line 27, "catalyst" should be -- crosslinking agent --;

, line 27, after "causing" insert -- the crosslinking agent to react with --.

Signed and Sealed this

Twenty-third Day of January, 2007

JON W. DUDAS
*Director of the United States Patent and Trademark Office*